United States Patent [19]
Kappel

[11] 3,936,213
[45] Feb. 3, 1976

[54] DEVICE FOR USE WITH DRILLS OR THE LIKE FOR THE COLLECTION OF WORKING DEBRIS

[76] Inventor: Friedrich Kappel, Sudring 3, 8941 Trunkelsberg, Germany

[22] Filed: Mar. 14, 1974

[21] Appl. No.: 451,272

[52] U.S. Cl. .................... 408/67; 408/72 R
[51] Int. Cl.² ............. B23B 47/00; B23B 39/00
[58] Field of Search .............. 408/67, 72 R, 241 G; 144/252; 175/211; 145/116 A; 51/270

[56] References Cited
UNITED STATES PATENTS

| | | | |
|---|---|---|---|
| 2,792,199 | 5/1957 | Becker et al. | 175/211 |
| 3,339,435 | 9/1967 | Heitz | 408/67 |
| 3,583,821 | 6/1971 | Shaub | 408/72 |

FOREIGN PATENTS OR APPLICATIONS

| | | | |
|---|---|---|---|
| 209,865 | 1/1924 | United Kingdom | 175/211 |

Primary Examiner—Harrison L. Hinson
Attorney, Agent, or Firm—Holman & Stern

[57] ABSTRACT

A collector for use on or in association with drills or other tools which in use produce dust, splinters, powder, chips, shavings or other debris. It comprises a hollow annular housing which can be attached to the working component of the tool in the vicinity of the operating part.

1 Claim, 5 Drawing Figures

3,936,213

DEVICE FOR USE WITH DRILLS OR THE LIKE FOR THE COLLECTION OF WORKING DEBRIS

BACKGROUND AND SUMMARY OF THE INVENTION

This invention relates to a device which is destined for use with tools, for example drills, which in use generate dust, splinters, powder, chips, shavings and the like, all generally referred to below as debris.

To take the example quoted, when a drill is used to produce a hole in a wall, for say the reception of a plug, in many instances the drilling produces a large quantity of dust or powder. Not only is this powder a nuisance in the immediate vicinity of the hole, or immediately below it, but it is frequently the case that the motor of the drill spreads the dust or powder over a comparatively wide area. This is particularly so when the drill hole is at a considerable distance from ground level or when drilling is to take place above the head of the user. Apart from the soil which is developed there is the danger that the dust or powder may get into the eyes or other parts of the body of the user. Moreover, the soiling of the chuck or other parts of the drill can interfere with the job.

The disadvantages specified above apply particularly to rotary tools, such as drills. It is pointed out, however, that similar disadvantages are encountered in the case of tools which work with an impacting action, or tools which are both reciprocating impact and rotation to attack the work.

Attempts have been made to combat this failing, for example using suction extractors or similar means at the site. This is accompanied by the disadvantage, however, that in addition to the comparatively expensive nature of the expedients adopted, almost invariably it calls for the assistance of an additional party to take care of this part of the procedure. Moreover, the collection effecting is not sufficiently reliable.

It is an object of this invention to provide a means for use with tools of the kind specified above which completely or largely inhibit the distribution of dust or like debris.

To this end the present invention provides an arrangement whereby the working component of the tool can be largely enclosed by a hollow collector housing for the debris, this collector being carried by the component or by other parts of the tool. In the case of a rotary tool it is proposed that the collector housing shall turn with the tool. In this case it is of advantage to make the collector rotationally symmetrical, and with an opening for the passage of the tool. In the case of non-rotating tools, which for example only have a reciprocating impact function, this rotationaly symmetry is not necessary.

A particular advantage of the present invention lies in the fact that the dust or other debris is trapped directly at the point at which it is generated and this by means of a device which is connected to the tool itself. In other words no additional servicing or facilities are required. In the case particularly of rotary tools the rotational drive is used to augment the trapping action of the collector housing. Generated particles of dust or the like which enter the rotary collector are entrained and positively held as a result of the actual operation of the tool. This effect is independent of the particular orientation of the tool. In the case particularly of overhead operation the best results are achieved because the dust falls straight into the collector and is not spewed out. However, even when the orientation of the drill is horizontal, a practically dust-free operation is experienced. The retention of the dust is of course, less positive in non-rotary tools, but even here particularly favourable results have been experienced.

It is of advantage to have the collector displaceable longitudinally of the tool to cater for accurate positioning thereof relatively to the operating end of this tool. For this purpose use may be made of a spring means to bias the collector in the direction of the tool. A spring for this purpose, can, for example, be mounted on a support plate and for instance, be of conical form so that it will occupy minimum space when depressed.

BRIEF DESCRIPTION OF THE DRAWINGS

Embodiments of the device according to this invention are illustrated in the accompanying drawings, in which.

DESCRIPTION OF THE PREFERRED EMBODIMENTS

Figure 1:
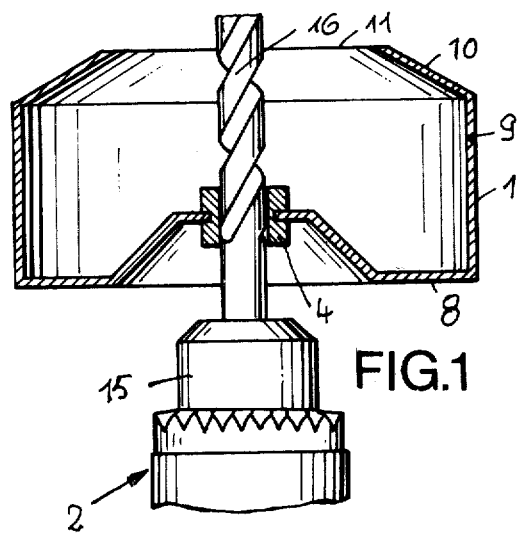
FIG. 1 shows a section through a debris collector in accordance with this invention mounted at the leading end of a drill.
Figure 2:
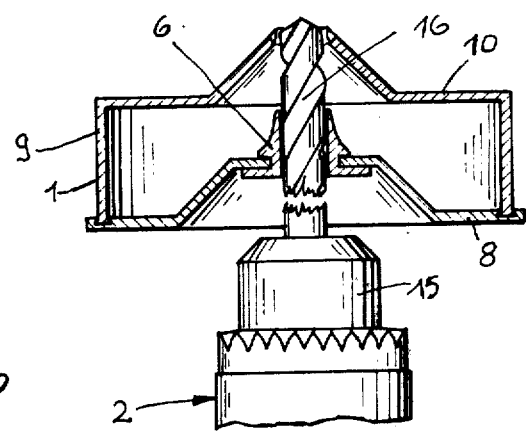
FIGS. 2 and 3 illustrate modified forms of the collector, in each case shown mounted on a drill.
Figure 3:
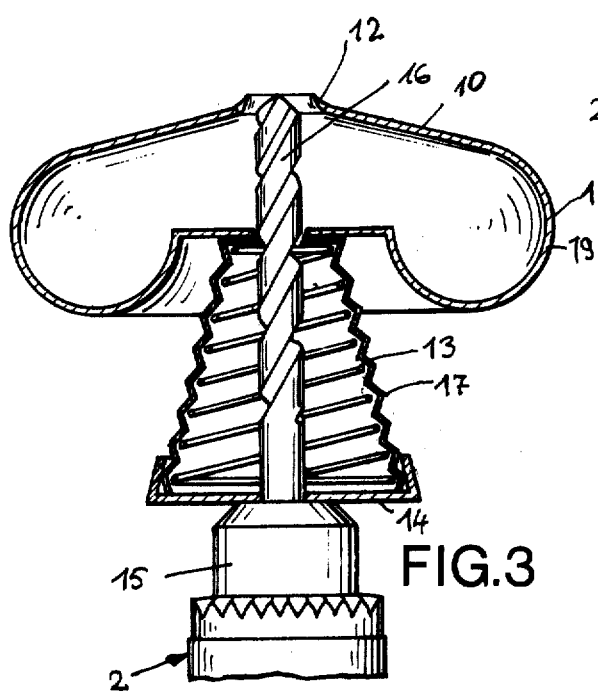

FIGS. 1, 2 and 3 show a drill bit 16 mounted in the chuck 15 of a drill, which latter can be of any standard or other form. In the embodiment illustrated in FIG. 1 a collector housing 1 is mounted on the bit 16 through the medium of a seal 4, and this housing has a base 8, a cylindrical side wall 9, and a coned top 10. This latter has a comparatively large filling opening 11. Dust or other debris produced by the drill falls into the rotating collector 1 and, during the operation of the tool, is thrown against the wall 9. When the tool is stopped the dust in collector housing 1 can be emptied out through opening 11. It will be apparent that it is of advantage to have the collector 1 as near as possible to the drilling site, i.e. to the drilled hole, to collect the optimum amount of dust before it can escape.

FIG. 2 of the drawings show a modified version of the collector. In this the base 8 has a sealing bush 6 by which it is mounted on the drill bit, whilst the dust collection opening 11 is only slightly larger than the diameter of the drill bit itself. Moreover, in this case the wall 9 and the cover or top 10 are made separately from base 8 and are separably fitted together. In the arrangement illustrated in FIG. 1 the parts 8, 9 and 10 are integral.

In the variant illustrated in FIG. 3 the collector housing has an outer wall 19 of curved cross-section and the cover or top 10 is provided with a lip 12 of tapered section around the filling opening 11. In this case, moreover, a spring 13 is mounted on a support plate 14 and bears against the base of the collector housing to bias the latter upwards. Plate 14 has several functions. First of all it is a support for spring 13; secondly it is intended to collect any dust, power or like debris which may come down from the collector 1 through the opening which is provided in the base of the latter for passage of the bit. It will be appreciated that such debris may well be brought down in the lands of the bit. This construction further includes a bellows 17 which is mounted between the plate 14 and the base of collector housing 1, and prevents the escape of very fine particles of dust. This is particularly useful when the support plate 14 is a substantial distance from housing 1. The rim 12 of the collector housing 1 is pressed against the drilling site by spring 13.

Figure 4:
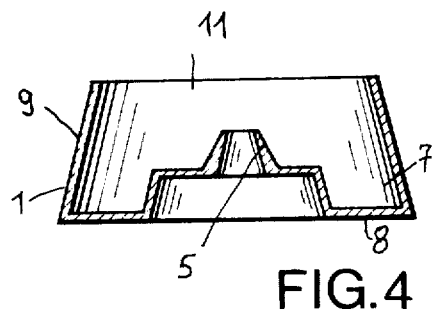
FIGS. 4 and 5 are sections through details of modified forms of collector.

FIG. 4 illustrates a somewhat modified form of collector according to the invention, in which the base 8 has formed therein a tapered flange 5. The side wall 9 is in this case of a simple frusto-conical shape, these two parts defining between them an annular trough 7.

Figure 5:
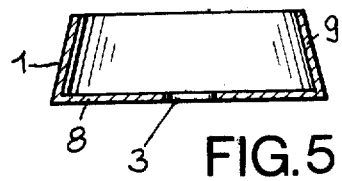

FIG. 5 shows an even more elementary form of collector which can be used, this having a flat base 8 with an opening 3 therein for the drill bit and a frusto-conical side wall 9.

The device according to this invention can be made of various materials. Fabrication from plastics material is thought particularly appropriate. For example, where it is of simple shape and of thin gauge, it can be made so inexpensive as to be of a throw-away character intended for one use only.

Where sealing bushes or grommets such as those depicted at 4 and 6 in the drawings are used, these can be supplied in the form adaptable to various sizes of bits. They may for example, be made of a stepped internal diameter so that parts can be broken off to suit them to different tool dimensions.

In the embodiments of the invention illustrated in the drawings the collector is in every case carried by the bit 16 itself. This arrangement is preferred in the case of drills. In other instances, however, it may be of advantage to mount the collector directly on a part of the tool or machine carrying the actual tool, for example on the chuck 15, as in the case illustrated in FIG. 3, or any other parts of the machine which is used to hold or mount the tool. It is of course, of advantage for the collector to rotate rapidly. Only in the case of impact tools is a non-rotating collector of advantage.

It will be understood that the invention secures optimum advantages in the case of hand-operated tools, for example drills. It can, however, be used in the case of a tool, for example a drill or the like, which is mounted in a base frame and is mechanically or otherwise operated.

I claim:

1. In combination a debris collection device and a tool having a rotatable working component which generates debris during operation, said collection device comprising a hollow collector housing which is disposed around said working component and rotatable therewith, said housing having a base, an annular side wall and an upper opening for receiving generated debris, said housing being mounted on a part of the tool through compression spring means which urges the housing in the direction of the operative end of the working component of the tool, said spring means being carried by a support plate which rests on said part of the tool, and a bellows disposed on said support plate and around the spring means, said spring means and support plate being positioned between the collector housing and the part of the tool upon which the support plate rests.

* * * * *